US012656269B2

(12) United States Patent
Jin et al.

(10) Patent No.: US 12,656,269 B2
(45) Date of Patent: Jun. 16, 2026

(54) APPARATUS AND METHOD FOR HANDLING WAFER STORAGE BOX

(71) Applicants: TAIWAN SEMICONDUCTOR MANUFACTURING COMPANY, LTD., Hsinchu (TW); TSMC CHINA COMPANY LIMITED, Shanghai (CN)

(72) Inventors: Xiao Jin, Shanghai City (CN); Qin Sun, Shanghai City (CN)

(73) Assignees: TAIWAN SEMICONDUCTOR MANUFACTURING COMPANY, LTD., Hsinchu (TW); TSMC CHINA COMPANY LIMITED, Shanghai (CN)

( * ) Notice: Subject to any disclaimer, the term of this patent is extended or adjusted under 35 U.S.C. 154(b) by 197 days.

(21) Appl. No.: 18/438,227

(22) Filed: Feb. 9, 2024

(65) Prior Publication Data

US 2025/0244257 A1     Jul. 31, 2025

(30) Foreign Application Priority Data

Jan. 26, 2024     (CN) .......................... 202410118319.8

(51) Int. Cl.
| | |
|---|---|
| *G01N 21/95* | (2006.01) |
| *B65B 57/08* | (2006.01) |
(Continued)

(52) U.S. Cl.
CPC ............. *G01N 21/95* (2013.01); *B65B 57/08* (2013.01); *B65D 25/107* (2013.01); *B65D 53/00* (2013.01); *B65D 53/06* (2013.01); *B65D 81/05* (2013.01); *B65D 85/30* (2013.01); *G01N 35/0099* (2013.01); *B65D 2585/86* (2013.01); *G01N 2201/06113* (2013.01)

(58) Field of Classification Search
CPC .............. G01N 21/95; G01N 35/0099; G01N 2201/06113; G01N 21/88; B65D 53/00; B65D 25/107; B65D 53/06; B65D 81/05; B65D 85/30; B65D 2585/86; B65B 57/08; B65B 2220/00; B65B 57/00; G01B 11/00; G01M 13/005
See application file for complete search history.

(56) References Cited

U.S. PATENT DOCUMENTS

| | | | |
|---|---|---|---|
| 4,467,214 A | * | 8/1984 | Ito ...................... G01N 21/9515 |
| | | | 250/559.47 |
| 2012/0075620 A1 | * | 3/2012 | Juni ....................... G01B 11/00 |
| | | | 356/601 |

(Continued)

FOREIGN PATENT DOCUMENTS

| | | | | |
|---|---|---|---|---|
| JP | 2006240674 A | * | 9/2006 | |
| TW | 201913864 A | | 4/2019 | |

*Primary Examiner* — Tarifur R Chowdhury
*Assistant Examiner* — Kaitlyn E Kidwell
(74) *Attorney, Agent, or Firm* — Maschoff Brennan

(57) ABSTRACT

A method includes placing a wafer storage box onto a stage; opening the wafer storage box, such that a sealing strip of the wafer storage box is exposed; directing a light beam over the sealing strip; determining whether the light beam is blocked by the sealing strip; and in response the determination determines that the light beam is blocked by the sealing strip, performing a maintenance process on the sealing strip.

20 Claims, 16 Drawing Sheets

(51) Int. Cl.

| | | |
|---|---|---|
| *B65D 25/10* | (2006.01) | |
| *B65D 53/00* | (2006.01) | |
| *B65D 53/06* | (2006.01) | |
| *B65D 81/05* | (2006.01) | |
| *B65D 85/30* | (2006.01) | |
| *G01N 35/00* | (2006.01) | |

(56)          References Cited

U.S. PATENT DOCUMENTS

| | | | |
|---|---|---|---|
| 2019/0067057 A1* | 2/2019 | Hu | H01L 21/67733 |
| 2023/0278234 A1* | 9/2023 | Wolf | B25J 9/0096 |
| | | | 700/258 |
| 2025/0085185 A1* | 3/2025 | Jeong | G01N 21/9054 |

* cited by examiner

100

142
146 } 140
144

102

172
174 } 170

HB
LB

BA

CR

160

160

110

130    120    122    130

100

200 { 210
      220

140

CR

170
BA

RM1

224H

222 } 220
224

214 } 210
212

160

120

110    160                    122

$140 \begin{cases} 142 \\ 146 \\ 144 \end{cases}$ $200 \begin{cases} 210 \\ 220 \end{cases}$

100

142

146

$144 \begin{cases} 144A \\ 144F \end{cases}$

224H

170

160

CR

220

300
210I
210
212
160
120

110

400

100

400

CR

190

180

RM1

140A
170A 140B
170B
200B
160B
120B
110

200A
120A
160A

120

104

M1'

| using a robot arm to move a wafer storage box onto a identifying position of a handling apparatus | S01 |

| identifying a type of the wafer storage box | S02 |

| using the robot arm to move the wafer storage box onto one of two different rotary stages according to the type of the wafer storage box | S1' |

M1

APPARATUS AND METHOD FOR HANDLING WAFER STORAGE BOX

PRIORITY CLAIM AND CROSS-REFERENCE

This application claims priority to China Application Serial Number 202410118319.8, filed Jan. 26, 2024, which is herein incorporated by reference.

BACKGROUND

Wafers are used in the production of silicon semiconductor integrated circuits. Wafers can be processed into various circuit element structures and become integrated circuit products with specific electrical functions. Wafers may be thin and fragile. Therefore, to transport the wafers, storage and transportation boxes are used to carry the wafer to improve its stability.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2-7A are schematic views of an apparatus for handling a wafer storage box in accordance with some embodiments of the present disclosure.

DETAILED DESCRIPTION

Figure 1:
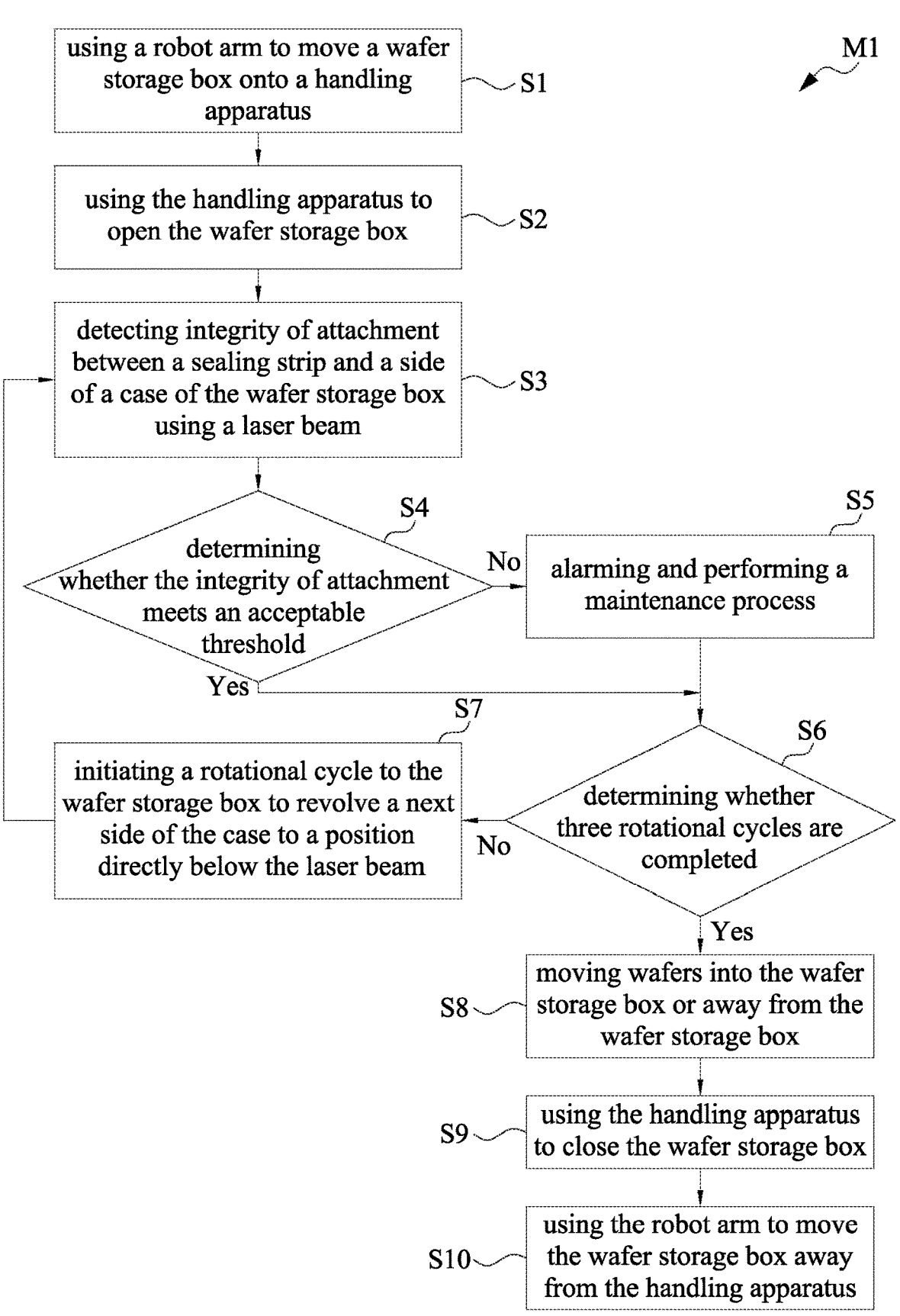
FIG. 1 is a flow chart of a method for handling a wafer storage box in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flow chart of a method for handling a wafer storage box in accordance with some embodiments of the present disclosure. The method M1 includes steps S1-S10. At step S1, a wafer storage box is moved onto a handling apparatus by a robot arm. At step S2, the wafer storage box is opened by the handling apparatus. At step S3, integrity of attachment between a sealing strip and a side of a case of the wafer storage box is detected using a laser beam. At step S4, the integrity of attachment is evaluated to determine whether the integrity of attachment between the sealing strip and the side of the case of the wafer storage box meets an acceptable threshold. At step S5, an alarm event occurs, a maintenance process is performed by an operator. At step S6, it is determined whether the wafer storage box has undergone three rotational cycles. At step S7, if the wafer storage box has not completed three rotational cycles, it initiates an additional rotational cycle to the wafer storage box to revolve a next side of the case to a position directly below the laser beam. At step S8, if the wafer storage box has undergone three rotational cycles, wafers are moved into the wafer storage box or away from the wafer storage box. At step S9, the wafer storage box is closed by using the handling apparatus. At step S10, the wafer storage box is moved away from the handling apparatus by using the robot arm. It is understood that additional steps may be provided before, during, and after the steps S1-S10 shown in FIG. 1, and some of the steps S1-S10 described below can be replaced or eliminated for additional embodiments of the method. The order of the operations/processes may be interchangeable.

Figure 2:
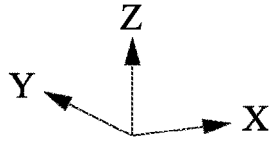

FIGS. 2-7A are schematic views of an apparatus 100 for handling a wafer storage box 200 in accordance with some embodiments of the present disclosure. Reference is made to FIG. 2. In some embodiments of the present disclosure, the apparatus 100 includes a working platform 110, a rotary stage 120 over the working platform 110, a position sensor 130, a gripping mechanism 140, an unlocking mechanism 160, and a light inspection device 170. The working platform 110 has a top surface substantially parallel with a X-direction and a Y-direction orthogonal to the X-direction. The rotary stage 120 is over the working platform 110 and configured to rotate a wafer storage box 200 its central axis extending along the Z-direction that is orthogonal to the X-direction and the Y-direction. The position sensor 130 may detect the loading or the unloading of the wafer storage box. The gripping mechanism 140 may be disposed directly above the rotary stage 120 and configured to open and close the wafer storage box 200. The unlocking mechanism 160 may be disposed on opposite sides of the rotary stage 120 and configured to unlock and lock the wafer storage box 200. The light inspection device 170 may be disposed above the rotary stage 120 and configured to detect a condition of the sealing strip of the wafer storage box 200. The light inspection device 170 may include a light emitter 172 generating the light beam LB along the X-direction and a light sensor 174 receiving the light beam LB. In some embodiments, the apparatus 100 may include a wall 102 for supporting the gripping mechanism 140 and the light inspection device 170. For example, the apparatus 100 may further include horizontal bars BA fixed on the wall 102 and supporting the light emitter 172 and the light sensor 174.

The apparatus 100 may further include a controller CR configured for receiving information from the position sensor 130 and the light inspection device 170 and for controlling operations of the rotary stage 120, the gripping mechanism 140, the position sensor 130, the unlocking mechanism 160, and the light inspection device 170. The controller CR may include a computer-readable storage medium and a processor coupled to the computer-readable storage medium. The computer-readable storage medium stores program that controls various steps of the method M1 (referring to FIG. 1) performed by the apparatus 100. The controller CR controls the operations of the apparatus 100 and robot arms by using the processor reading out and executing the program stored in the storage medium. The program may be one that has been stored in the computer-readable storage medium, or may be one that has been installed to the storage medium of the controller CR.

Figure 3:
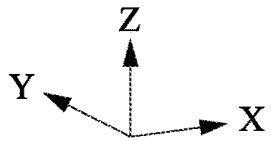

Reference is made to FIGS. 1 and 3. The method M1 begins at step S1, where a wafer storage box 200 is moved onto the handling apparatus 100 by a robot arm RM1. The wafer storage box 200 is placed on an area of the rotary stage 120. In some embodiments, the rotary stage 120 may have positioning protrusions 122 thereon for defining the area of the rotary stage 120 where the wafer storage box 200 is placed. In some embodiments, the rotary stage 120 is capable of rotating the wafer storage box 200. For example, the rotary stage 120 is a motorized rotary stage that restricts motion to a single axis of rotation (e.g., along Z-direction) and precisely controls angular position about that axis of rotation (e.g., along the Z-direction). A motor for controlling the rotary stage 120 may be disposed in the working platform 110.

In some embodiments, the position sensor 130 (referring to FIG. 2) may be disposed on the area of the rotary stage 120 where the wafer storage box 200 is placed. The position sensor 130 (referring to FIG. 2) may detect the loading of the wafer storage box 200. For example, the position sensor 130 (referring to FIG. 2) may include an opaque spring plate and a photo interrupter, in which the photo interrupter includes a light emitter and a light sensor. When the wafer storage box 200 is placed on the area of the rotary stage 120, the opaque spring plate of the position sensor 130 (referring to FIG. 2) may be pressed by the gravity of the wafer storage box 200 into a space between the light emitter and the light sensor, such that the light emitted from the light emitter is blocked from being detected by the light sensor. A non-detection status indicates the loading of the wafer storage box 200. On the other hand, the position sensor 130 (referring to FIG. 2) may also detect the unloading of the wafer storage box 200. For example, when the wafer storage box 200 is not placed on the area of the rotary stage 120, the opaque spring plate of the position sensor 130 (referring to FIG. 2) would return back to its original position and not be in the space between the light emitter and the light sensor, such that the light emitted from the light emitter would be detected by the light sensor. A detection status may indicate the unloading of the wafer storage box 200.

In some embodiments, the wafer storage box 200 has a case 210 and a cover 220. The cover 220 may have a cover body 222 and a pair of extension side parts 224 connected with the cover body 222. The extension side parts 224 of the cover 220 may have holes 224H for gripping convenience. In some embodiments, the case 210 may have a body 212 surrounding an interior of the case 210 and elements 214 to be locked with elements of the extension side parts 224 of the cover 220. The wafer storage box 200 may also be referred to as a wafer shipping box in the context.

Figure 4:
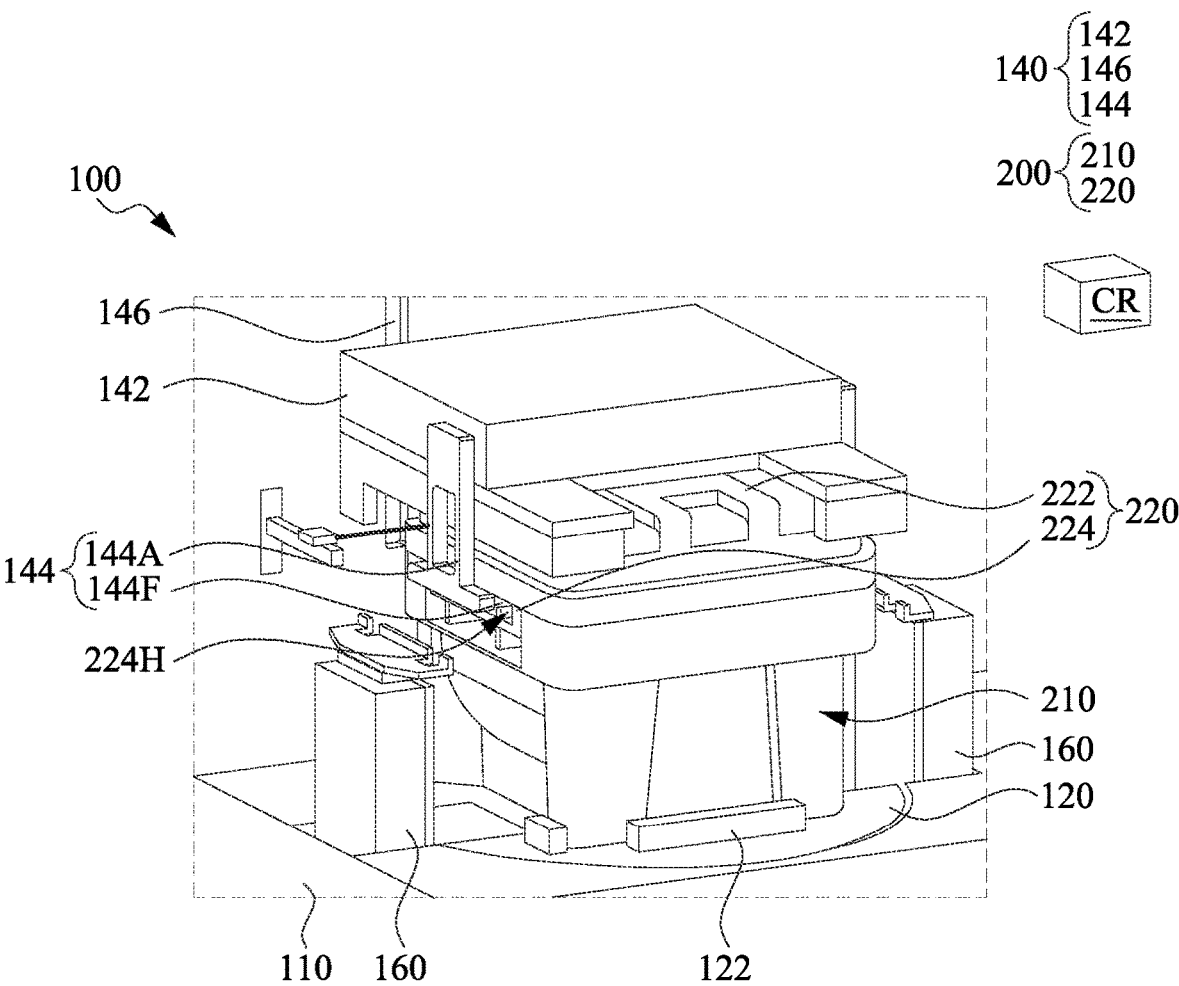
Figure 4:
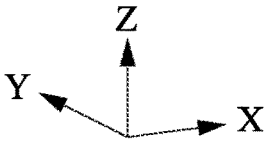

Reference is made to FIGS. 1 and 4-6. The method M1 proceeds to step S2, where the wafer storage box 200 is opened by the handling apparatus 100. Reference is made to FIG. 4. The gripping mechanism 140 has a gripping body 142, a pair of grippers 144, and a vertical rail 146. Each of the grippers 144 may have an arm 144A and plural fingers 144F, in which the fingers 144F are supported by the arm 144A, and the top portion of the arm 144A is connected to the gripping body 142. The gripping body 142 may be vehicle that is capable of moving upward or downward through the vertical rail 146 along the Z-direction. The grippers 144 may move toward or away from the wafer storage box 200 along the X-direction. In FIG. 4, the gripping body 142 moves downward, and the grippers 144 move toward the wafer storage box 200 with the fingers 144F inserted into the holes 224H of the extension side parts 224 of the cover 220. Thus, the gripping mechanism 140 grips the cover 220.

Figure 5:
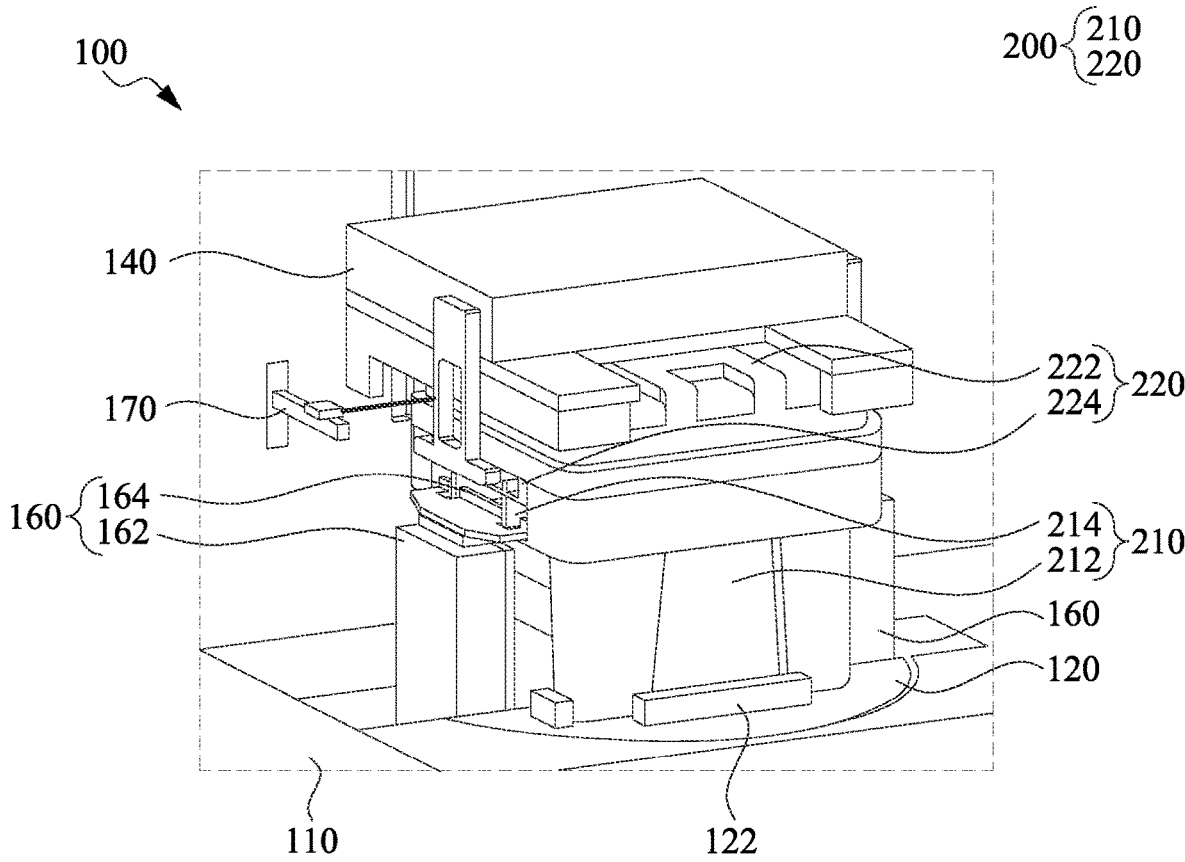
Figure 5:
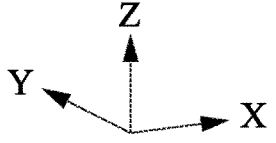

Reference is made to FIG. 5. The unlocking mechanism 160 has a body 162 and unlocking protrusion 164. The body 162 may move toward or away from the wafer storage box 200 along the X-direction. The unlocking protrusion 164 may move upward or downward along the Z-direction. In FIG. 5, the body 162 moves toward the wafer storage box 200, and the unlocking protrusion 164 moves upward to release the lock between elements of the extension side parts 224 of the cover 220 and the corresponding elements 214 of the case 210. Thus, the case 210 and the cover 220 of the wafer storage box 200 is unlocked.

Figure 6:
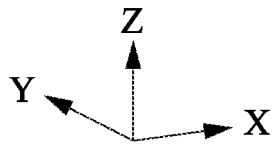

Reference is made to FIG. 6. The gripping body 142 moves upward along Z-direction. With the fingers 144F inserted into the holes 224H of the extension side parts 224 of the cover 220, the cover 220 of the wafer storage box 200 is gripped by the gripping mechanism 140 and disengaged from the case 210 of the wafer storage box 200 with the movement along Z-direction. In the illustrated embodiments, a wafer carrier 300 is disposed in the case 210. The wafer carrier 300 may have plural slots for receiving wafers. In some embodiments, the wafer carrier 300 is empty, and therefore are no wafers are supported by the wafer carrier 300. In some alternative embodiments, the wafer storage box 200 contains wafers.

Figure 7A:
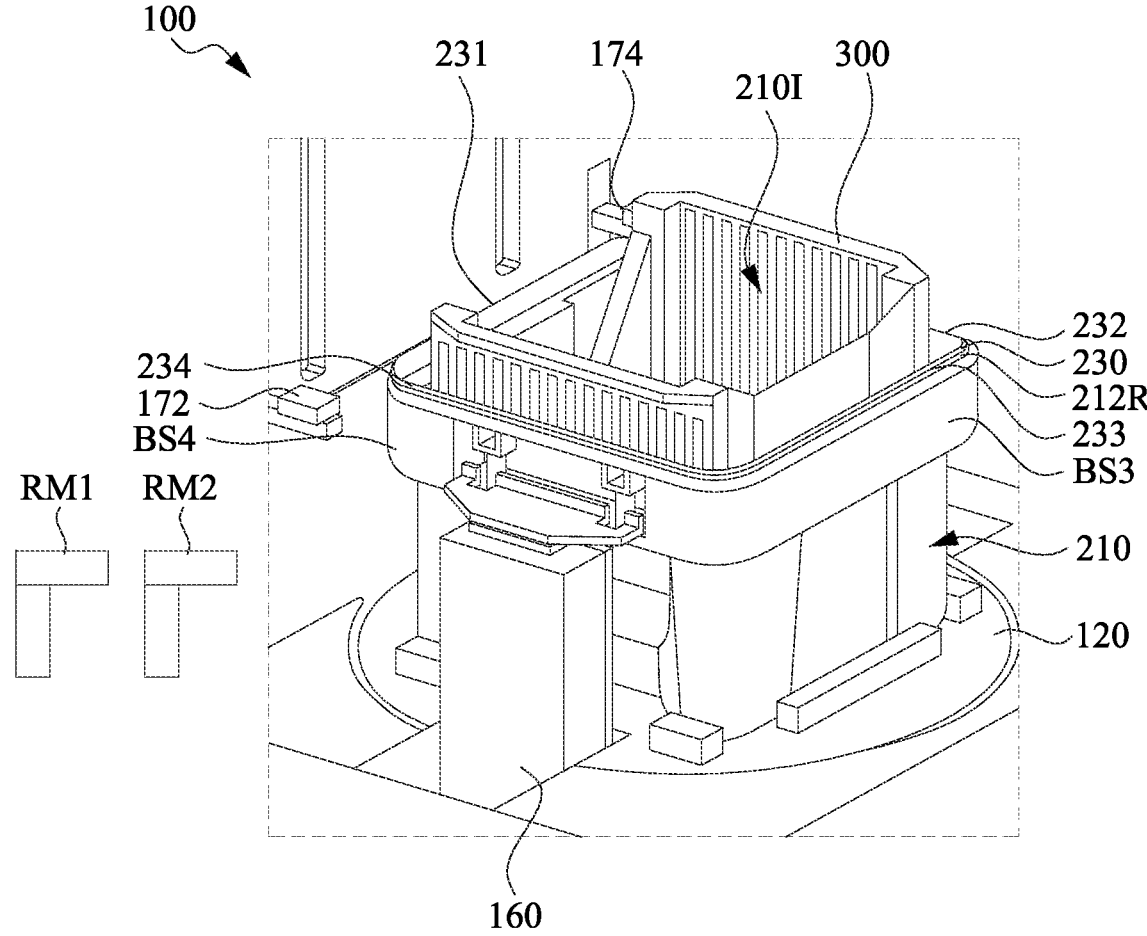
Figure 7A:
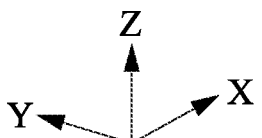

In some embodiments, referring to FIG. 7A, the wafer storage box 200 may include a sealing strip 230 over ledges 212R of the body 212. For example, the body 212 may have four sides surrounding the interior 2101 of the case 210, and the sealing strip 230 has four portions 231-234 respectively over ledges 212R of the four sides of the body 212. The sealing strip 230 may be disposed between the case 210 and the cover 220 of the wafer storage box 200. The sealing strip 230 may to isolate the interior of the wafer storage box 200 from the external environment. Hence, contaminating substances such as foreign micro-particles and corrosive gases are precluded from the interior of the wafer storage box 200. The sealing strip 230 may include suitable rubber materials. For example, in some embodiments, the sealing strip 230 may be a silicone strip. In some embodiments, the sealing strip 230 may be made of opaque materials. For example, the sealing strip 230 may have a light transmittance less than about 50% in an operating wavelength range of the light inspection device 170 (e.g., at a wavelength of the light beam LB), or even less than about 20% in the operating wavelength range of the light inspection device 170 (e.g., at the wavelength of the light beam LB). For example, the sealing strip 230 may have a light absorbance greater than about 50% in the operating wavelength range of the light inspection device 170 (e.g., at the wavelength of the light beam LB), or even greater than about 80% in the operating wavelength range of the light inspection device 170 (e.g., at the wavelength of the light beam LB).

Figure 7B:
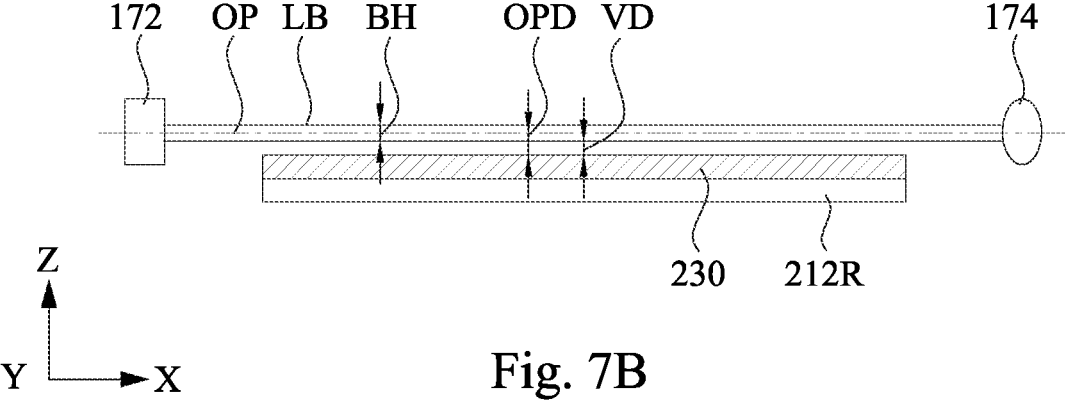
FIGS. 7B and 7C are side views illustrating detection conditions of the wafer storage box in accordance with some embodiments of the present disclosure.
Figure 7C:
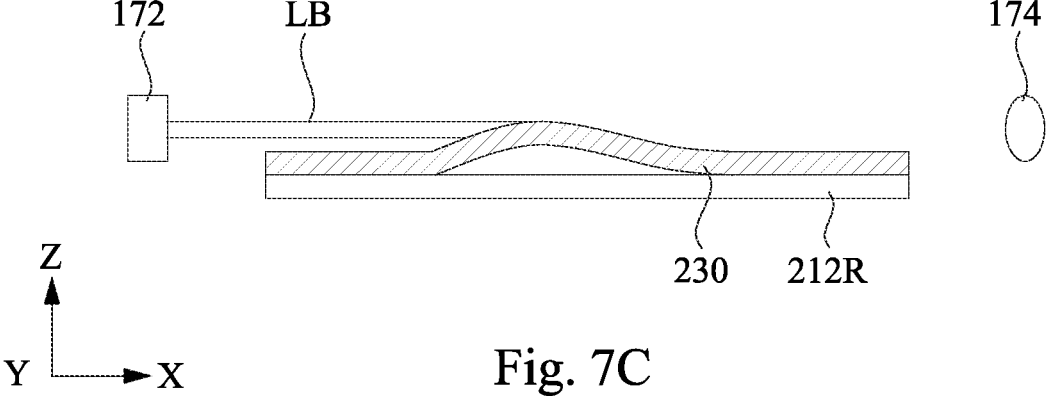

Reference is made to FIGS. 1 and 7A. The method M1 proceeds to step S3, where integrity of attachment between the sealing strip 230 and a side of the case 210 of the wafer storage box 200 is detected using a light beam LB. FIGS. 7B and 7C are side views illustrating detection conditions of the wafer storage box 200 in accordance with some embodiments of the present disclosure. Reference is made to FIGS. 7A-7C, the optical path of the light beam LB is right above the sealing strip 230. The optical path of the light beam LB is higher than and substantially parallel to the top surface of the ledges 212R of the side of the body 212. In FIG. 7B, when the sealing strip 230 is attached securely to the ledges 212R of the side of the body 212 (i.e., the sealing strip 230 fully conforms to the ledges 212R in the cross-sectional via as illustrated in FIG. 7B), the light beam LB is not blocked and can be detected by the light sensor 174. In FIG. 7C, when the sealing strip 230 is partially detached from the ledges 212R of the side of the body 212 (i.e., the sealing strip 230 does not fully conform to the ledges 212R in cross-sectional view), the light beam LB is blocked by the sealing strip 230 and cannot be detected by the light sensor 174.

The method M1 proceeds to step S4, where the integrity of attachment detected in the previously step S3 is evaluated to determine whether the detected integrity of attachment between the sealing strip 230 and the first side of the wafer storage box 200 meets an acceptable threshold. The evaluation relies on determining whether the light beam LB is blocked by the sealing strip 230. For example, if a light intensity measured by the light sensor 174 is greater than a predetermined threshold value, the detected integrity of attachment between the sealing strip 230 and the ledge 212R of the side of the case 210 of the wafer storage box 200 is determined as acceptable. And, if a light intensity measured by the light sensor 174 is less than a predetermined threshold value, the detected integrity of attachment between the sealing strip 230 and the ledge 212R of the side of the case 210 of the wafer storage box 200 is determined as unacceptable. In some embodiments, the predetermined threshold value may be about a predetermined ratio of the light intensity of the light beam LB emitted from the light emitter 172, in which the predetermined ratio may be in a range from about 10% to about 80%, such as about 20%.

Once the detected integrity of attachment between the sealing strip 230 and the ledge 212R of the side of the case 210 of the wafer storage box 200 is determined as unacceptable, the method M1 proceeds to step S5, where an alarm event occurs, a maintenance process is performed by an operator. In some embodiments, during the maintenance process, the operator may be notified by the alarm event, and manually push the sealing strip 230 back to contact the ledges 212R of the side of the case 210 of the wafer storage box 200. By the maintenance process, the sealing strip 230 is recovered to be attached securely to the ledges 212R of the side of the case 210 of the wafer storage box 200. Stated differently, the maintenance process turns the condition shown in FIG. 7C into the condition shown in FIG. 7B. In some embodiments, the maintenance process may include adjusting a position of the sealing strip 230, such that the light beam LB, which was blocked by the sealing strip 230 as shown in FIG. 7C, is turned to be not blocked by the sealing strip 230 as shown in FIG. 7B. In some embodiments, the maintenance process may include reducing a gap between the sealing strip 230 and the ledges 212R of the side of the case 210. For example, the gap between the sealing strip 230 and the ledges 212R as shown in FIG. 7C is reduced or eliminated, such that no gap is between the sealing strip 230 and the ledges 212R as shown in FIG. 7B.

In some embodiments, the light beam LB may be a laser beam, and the light emitter 172 may be a laser source, such as a laser diode. In some embodiments, the light beam LB may be a collimated beam with a divergence angle less than 2 mrad. In some embodiments of the present disclosure, the light beam LB may have a visible wavelength in a range from 300 nanometers to about 700 nanometers. In some alternative embodiments, the light beam LB may have any other suitable wavelength. The light sensor 174 may have an operable wavelength range overlapping or covering the wavelength range of the light beam LB, such that the light sensor 174 is capable of generating an output signal indicating the intensity of received light. In some embodiments, the light beam LB may be a monochromatic light. For example, the light beam LB may be a red laser beam or a green laser beam. In some alternative embodiments, the light beam LB may be a polychromatic light.

In some embodiments, the light beam LB is spaced apart from the sealing strip 230 by a vertical distance VD (referring to FIG. 7B) ranging from about 0.5 millimeter to about 1 millimeter. Stated differently, a bottom of the profile of the light beam LB is higher than a top surface of the sealing strip 230 by the vertical distance VD (referring to FIG. 7B). If the vertical distance VD (referring to FIG. 7B) is greater than about 1 millimeter, the sealing strip 230 may peel off without alarm. If the vertical distance VD (referring to FIG. 7B) is less than about 0.5 millimeter, the alarm events may occur when the sealing strip 230 does not peel off. For example, in some embodiments, the light beam LB may have a beam height BH (or beam diameter) in a range from about 0.5 millimeter to about 1.5 millimeter. Thus, the optical path OP of the light beam LB (or the optical path of the light inspection device 170 including the light emitter 172 and the light sensor 174) may be spaced apart from the sealing strip 230 by a vertical distance OPD ranging from about 0.75 millimeter to about 1.75 millimeter. If the vertical distance OPD (referring to FIG. 7B) is greater than about 1.75 millimeter, the sealing strip 230 may peel off without alarm. If the vertical distance OPD (referring to FIG. 7B) is less than about 0.75 millimeter, the alarm events may occur when the sealing strip 230 does not peel off.

In some embodiments, the light beam LB may have suitable a beam size for high inspection accuracy. For example, the light beam LB may have a beam width BW (or beam diameter) (referring to FIG. 8A) less than a width of the sealing strip 230, such that the sealing strip 230 can fully block the light beam LB from the light sensor 174. In some embodiments, the light beam LB may have a beam width BW (or beam diameter) (referring to FIG. 8A) equal to or greater a width of the sealing strip 230, and the sealing strip 230 can block a portion of the light beam LB, which cause an observable change in light intensity detected by the light sensor 174. For example, the beam width BW (or beam diameter) of the light beam LB may be in a range from about 0.5 millimeter to about 1.5 millimeter. In some embodiments, the light beam LB may have a circular cross-section profile, such that the beam width BW is substantially equal to the beam height BH. In some embodiments, the light beam LB may have other cross-section profiles, and the beam width BW may be greater than or less than the beam height BH.

After the maintenance process at step S5, the method M1 proceeds to step S6. Alternatively, if detected integrity of attachment between the sealing strip 230 and the ledge 212R of the side of the case 210 of the wafer storage box 200 is determined as acceptable, the method M1 skips step S5 and just proceeds to step S6. At step S6, it is determined whether the wafer storage box has undergone three rotational cycles, wherein each rotational cycle involves a substantially 90-degree turn or 90-degree angular movement. In some embodiments, the controller CR can ascertain whether the wafer storage box 200 has completed three rotational cycles by tracking the number of rotations executed by the rotary stage 120 following the placement of the box onto said rotary stage 120. If the wafer storage box 200 has not completed three rotational cycles, the method M1 proceeds to step S7 to initiate a rotational cycle to the wafer storage box 200 revolve a next side of the case 210 around a central axis of the case 210 to a position directly below the light beam LB. By rotating the wafer storage box 200, Steps S3-S5 are performed repeatedly to four sides of the case 210 until the wafer storage box 200 has completed three rotational cycles as illustrated in FIGS. 8A-8D.

Figure 8A:
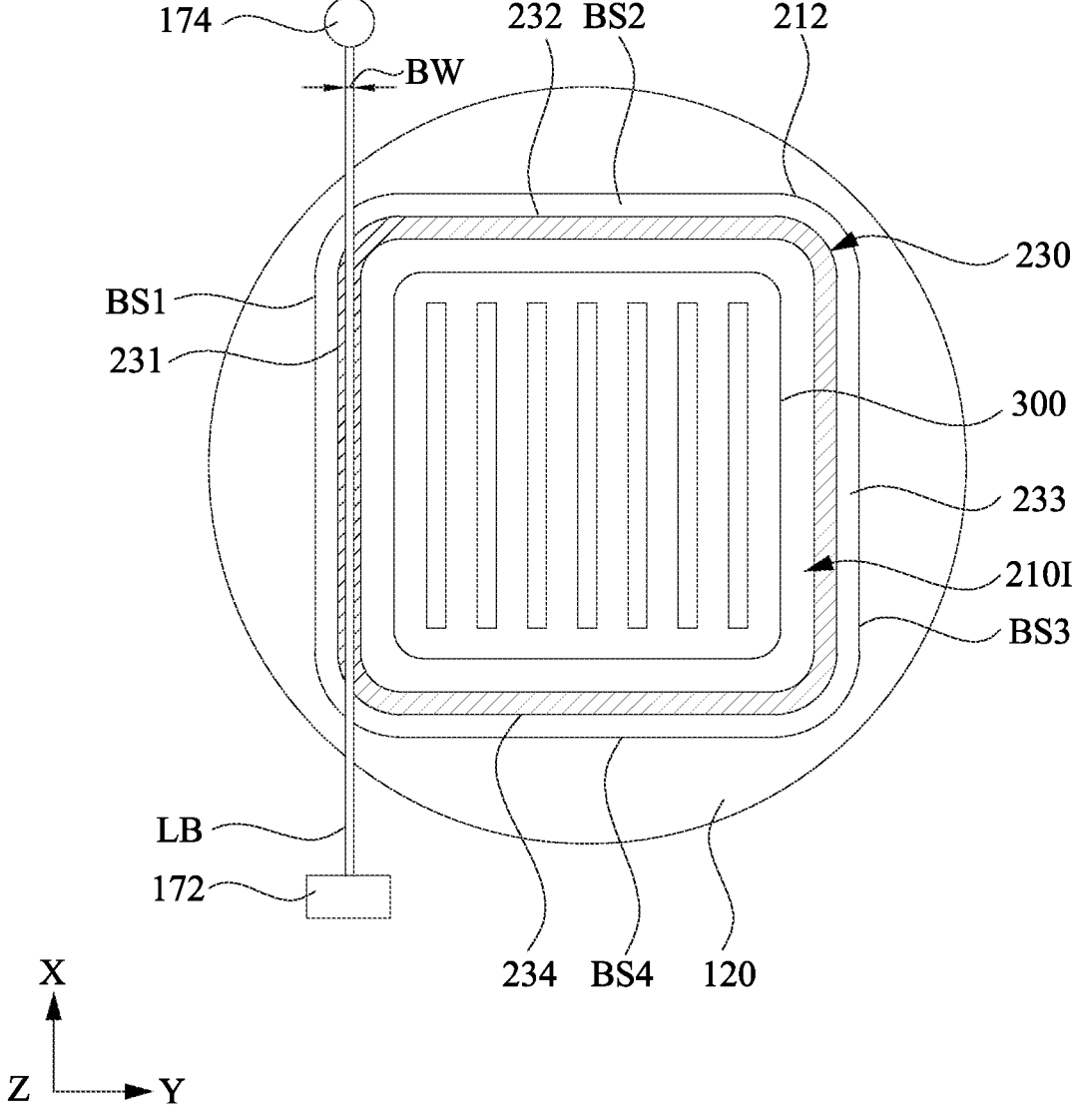
FIGS. 8A-8D are top views illustrating steps for detecting four sides of the wafer storage box in accordance with some embodiments of the present disclosure.
Figure 8B:
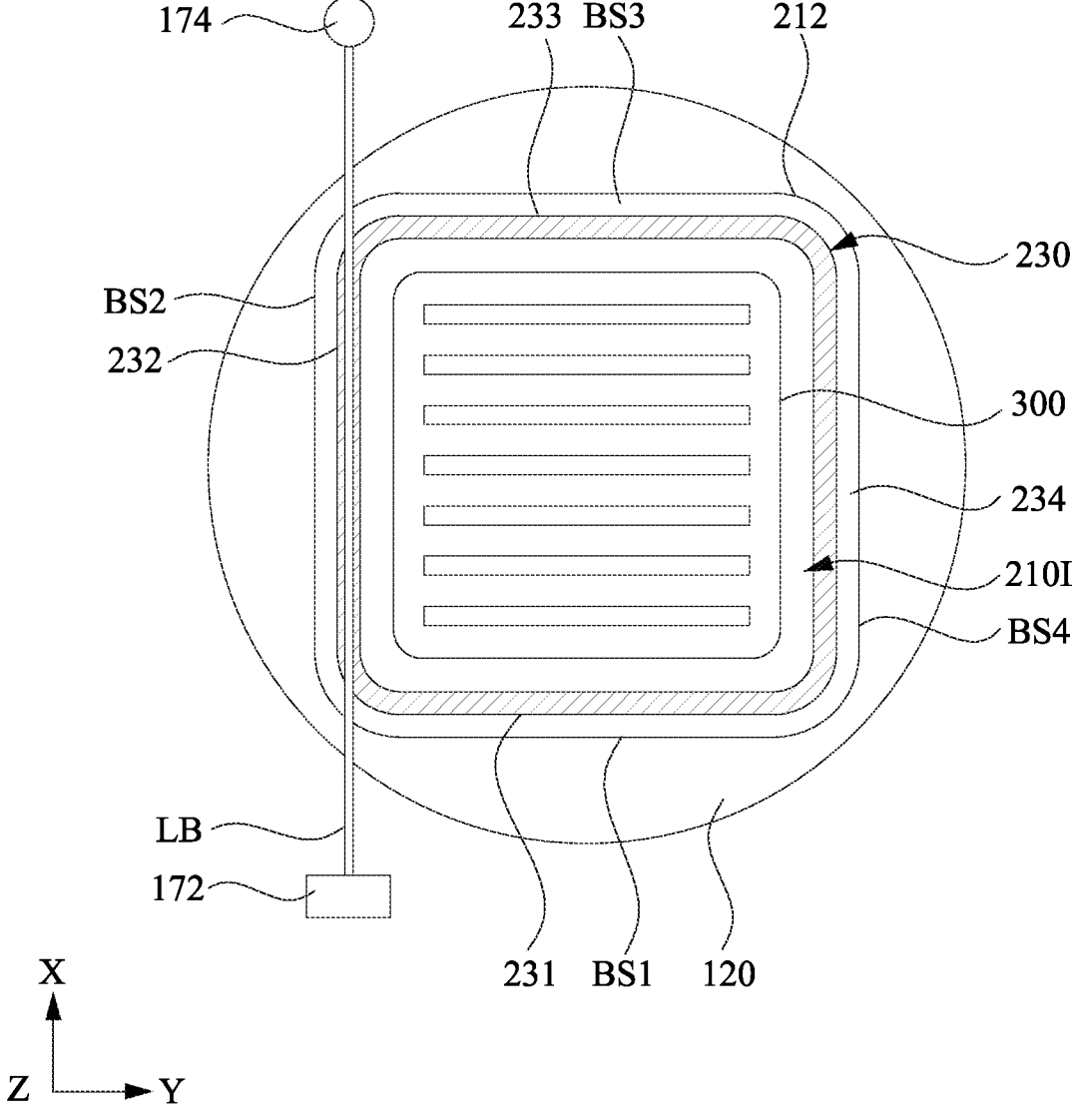

FIGS. 8A-8D are top views illustrating steps for detecting four sides of the wafer storage box 200 in accordance with some embodiments of the present disclosure. The light beam LB may overlap the rotary stage 120 when viewed from top. In FIG. 8A, a first side BS1 of the case 210 is directly below the light beam LB (i.e., vertically overlapping with the light beam LB in Z-direction), and the light beam LB is directly above the portion 231 of the sealing strip 230 over the first side BS1. For example, the light beam LB is parallel and overlaps with the first side BS1 when viewed from top. Thus, the integrity of attachment between the portion 231 of the sealing strip 230 and the first side BS1 is detected by the light beam LB at step S3. The integrity of attachment between the portion 231 of the sealing strip 230 and the first side BS1 is then evaluated at step S4. According to the evaluation result, the maintenance process at step S5 may be performed to the portion 231 of the sealing strip 230. After the step S4 (and optionally step S5), since the wafer storage box 200 has not completed three rotational cycles yet, the method M1 proceeds to step S7 where the wafer storage box 200 is rotated to revolve a second side BS2 of the case 210 to a position directly below the light beam LB, as illustrated in FIG. 8B. For example, to revolve the second side BS2 of the case 210 to directly below the light beam LB, the wafer storage box 200 is rotated about its central axis in Z-direction by a first rotation angle ranging from about 85 degrees to about 95 degrees, such as 90 degrees. Stated differently, the rotational cycle involves a substantially 90-degree turn or a 90-degree angular movement.

In FIG. 8B, the second side BS2 of the case 210 is directly below the light beam LB (i.e., vertically overlapping with the light beam LB in Z-direction), and the light beam LB is directly above the portion 232 of the sealing strip 230 over the second side BS2. For example, the light beam LB is parallel and overlaps with the second side BS2 when viewed from top. Thus, the integrity of attachment between the portion 232 of the sealing strip 230 and the second side BS2 is detected by the light beam LB at step S3. The integrity of attachment between the portion 232 of the sealing strip 230 and the second side BS2 is then evaluated at step S4.

Figure 8C:
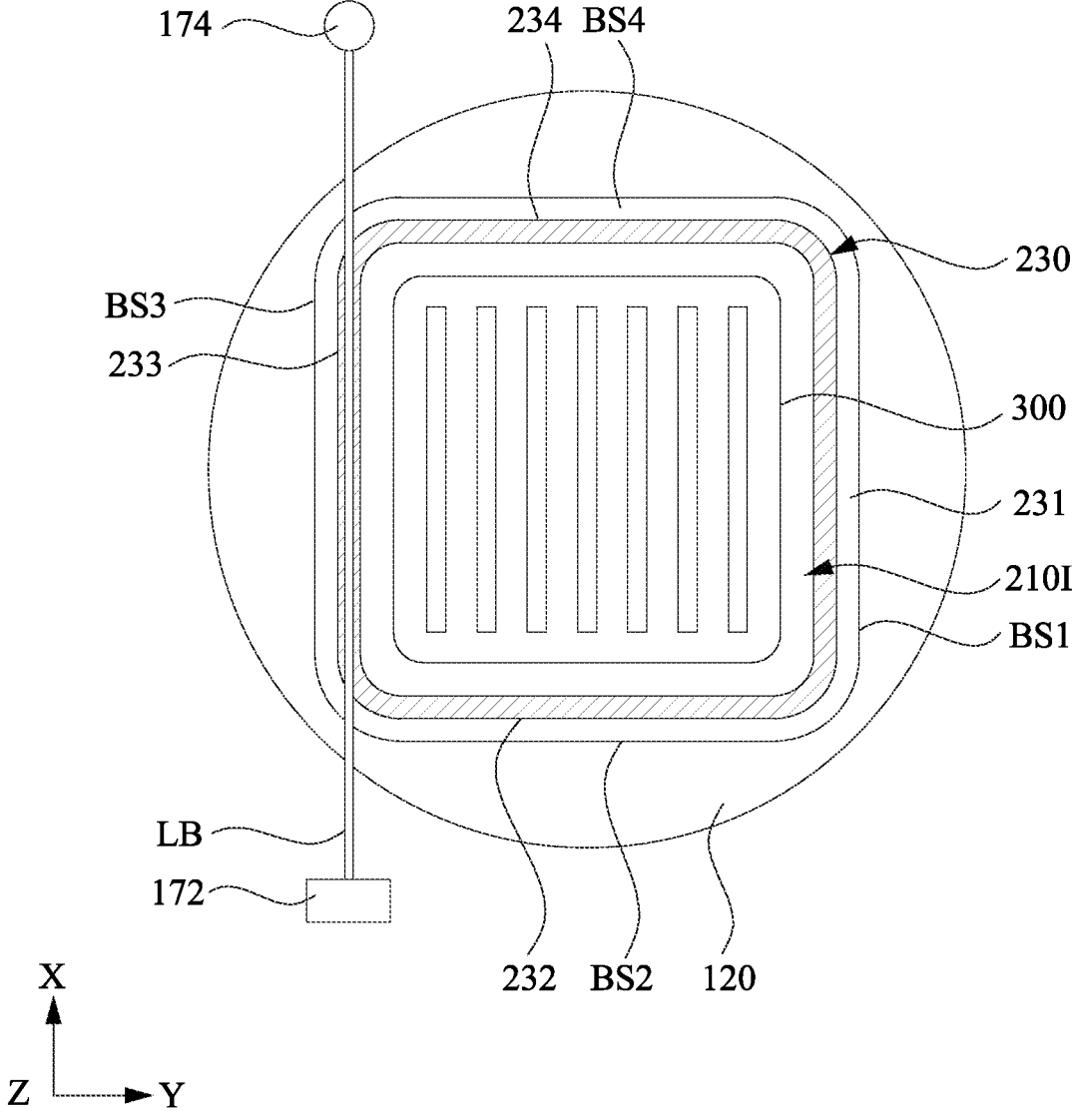

According to the evaluation result, the maintenance process at step S5 may be performed to the portion 232 of the sealing strip 230. After the step S4 (and optionally step S5), since the wafer storage box 200 has not completed three rotational cycles yet, the method M1 proceeds to step S7 where the wafer storage box 200 is rotated to revolve a third side BS3 of the case 210 to directly below the light beam LB, as illustrated in FIG. 8C. For example, to revolve the third side BS3 of the case 210 to directly below the light beam LB, the wafer storage box 200 is rotated about its central axis extending in Z-direction by a second rotation angle ranging from about 85 degrees to about 95 degrees, such as 90 degrees. Stated differently, this rotational cycle also involves a substantially 90-degree turn or a 90-degree angular movement, which is the same as the previous rotational cycle that revolves the second side BS2 to directly below the light beam LB.

Figure 8D:
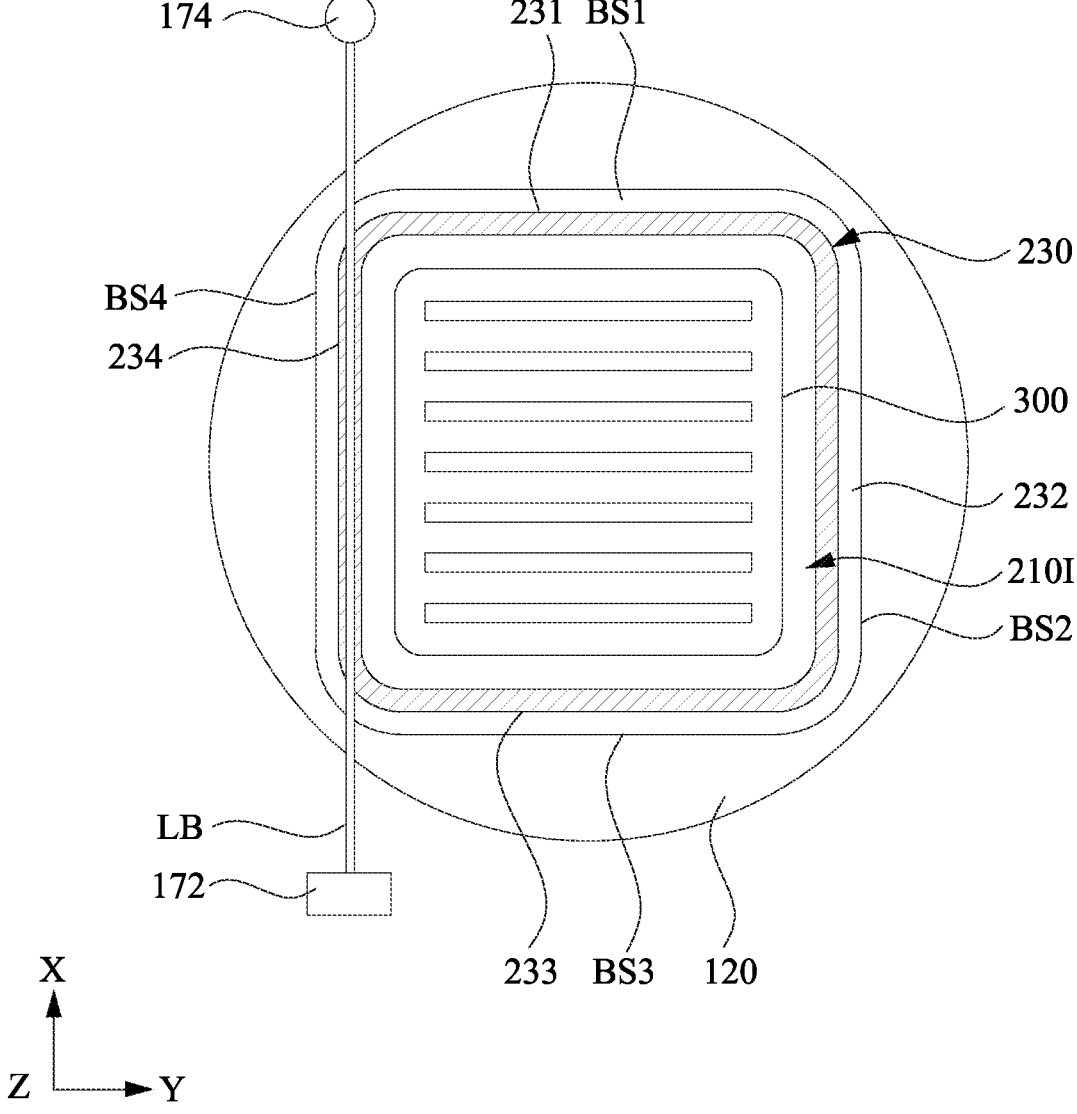

In FIG. 8C, the third side BS3 of the case 210 is directly below the light beam LB (i.e., vertically overlapping), and the light beam LB is directly above the portion 233 of the sealing strip 230 over the third side BS3. For example, the light beam LB is parallel and overlaps with the third side BS3 when viewed from top. Thus, the integrity of attachment between the portion 233 of the sealing strip 230 and the third side BS3 is detected by the light beam LB at step S3. The detected integrity of attachment between the portion 233 of the sealing strip 230 and the third side BS3 is evaluated at step S4. According to the evaluation result, the maintenance process at step S5 may be performed to the portion 233 of the sealing strip 230. After the step S4 (and optionally step S5), since the wafer storage box 200 has not completed three rotational cycles yet, the method M1 proceeds to step S7 where the wafer storage box 200 is rotated to revolve a fourth side BS4 of the case 210 to directly below the light beam LB, as illustrated in FIG. 8D. For example, to revolve the fourth side BS4 of the case 210 to directly below the light beam LB, the wafer storage box 200 is rotated about its central axis extending in Z-direction by a third rotation angle ranging from about 85 degrees to about 95 degrees, such as 90 degrees. Stated differently, this rotational cycle also involves a substantially 90-degree turn or a 90-degree angular movement, which is the same as the previous rotational cycles that revolves the second and third sides BS2, BS3 to directly below the light beam LB.

In FIG. 8D, the fourth side BS4 of the case 210 is directly below the light beam LB, and the light beam LB is directly above the portion 234 of the sealing strip 230 over the fourth side BS4. For example, the light beam LB is parallel and overlaps with the fourth side BS4 when viewed from top. Thus, the integrity of attachment between the portion 234 of the sealing strip 230 and the fourth side BS4 is detected by the light beam LB at step S3. The detected integrity of attachment between the portion 234 of the sealing strip 230 and the fourth side BS4 is evaluated at step S4. According to the evaluation result, the maintenance process at step S5 may be performed to the portion 234 of the sealing strip 230. After the step S4 (and optionally step S5), since the wafer storage box 200 has undergone three rotational cycles, the method M1 proceeds to step S8.

Reference is made to FIGS. 1 and 7A, at step S8, wafers are moved into the wafer storage box 200 or away from the wafer storage box 200, for example, by the robot arm RM2. For example, in some embodiments, the robot arm RM2 may move a wafer carrier 300 supporting plural wafers away from the wafer storage box 200, and then the wafers can be transferred to other wafer carriers, such as wafer boat, wafer cassette, front opening unified pod (FOUP), or the like, by other robot arms. The wafers can be disc-shaped silicon wafer, glass wafer, sapphire wafer or the like. After the wafers are transferred from the wafer carrier 300 to the other wafer carriers, the wafers can be transferred among various semiconductor fabrication apparatuses and/or processed by various semiconductor fabrication processes. In some alternative embodiments, after being transferred among various semiconductor fabrication apparatuses and/or processed by various semiconductor fabrication processes, wafers are transferred from the other wafer carriers to the wafer carrier 300, and then the robot arm RM2 may move the wafer carrier 300 supporting the wafers into the wafer storage box 200. In some embodiments, after step S6 and prior to step S8, the wafer storage box 200 may rotated to revolve the first side BS1 of the case 210 to directly below the light beam LB, as illustrated in FIG. 8A.

Reference is made to FIG. 1. The method M1 then proceeds to step S9 where the wafer storage box 200 is closed by using the handling apparatus 100. For example, the gripping body 142 of the gripping mechanism 140 (referring to FIGS. 5 and 6) may move downwards to put the cover 220 back onto the case 210, as the corresponding configuration shown in FIG. 5. The unlocking protrusion 164 of the unlocking mechanism 160 (referring to FIG. 5) may move downward along the axis Z, thereby locking the cover 220 and the case 210, as the corresponding configuration shown in FIG. 4. Then, the fingers 144F of the grippers 144 of the gripping mechanism 140 (referring to FIG. 4) may move outward from the holes 224H of the extension side parts 224, such that the gripping mechanism 140 does not grip the cover 220, as the corresponding configuration shown in FIG. 3. After the wafer storage box 200 is closed, referring to FIG. 7A, the method M1 proceeds to step S10 where the wafer storage box 200 is moved away from the rotary stage 120 of the handling apparatus 100 by using the robot arm RM1, for example, to a storage room. The robot arm RM1 may then move another wafer storage box 200 onto the handling apparatus 100. The closing operations at step S9 and the box movement operations at step S10 respectively correspond to the open operations at step S2 with respect to FIGS. 3-6 and the box movement operations at step S1 with respect to FIGS. 1-2, and therefore not specifically depicted herein.

Figure 9A:
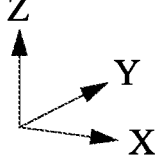
FIG. 9A is a schematic view of an apparatus for handling a wafer storage box in accordance with some embodiments of the present disclosure.

FIG. 9A is a schematic view of an apparatus 100 for handling a wafer storage box 200 in accordance with some embodiments of the present disclosure. The apparatus 100 may include a working platform 180, a rotary stage 190 over the platform 180, and one or more image sensors 400. The image sensors 400 may detect information regarding the types of the wafer storage box 200. For example, the wafer storage box 200 may have identification code, tags, or other features for recognition/identification, and the image sensors 400 may detect the information regarding the identification code, tags, or the features by images. The rotary stage 190 may rotate the wafer storage box 200 about its central axis extending in Z-direction, thereby allowing the image sensors 400 to detect plural sides of the wafer storage box 200. A motor for controlling the rotary stage 190 may be disposed in the working platform 180. For example, the rotary stage 190 is a motorized rotary stage that restricts motion to a single axis of rotation (e.g., along Z-direction) and precisely controls angular position about that axis of rotation (e.g., along Z-direction). The controller CR of the apparatus 100 may receive the detected information from the image sensors 400, and determine the types of the wafer storage box 200 based on the detected information. According to the determined types of the wafer storage box 200, the robot arm RM1 may move the wafer storage box 200 to a corresponding area for opening the wafer storage box 200.

Figure 9B:
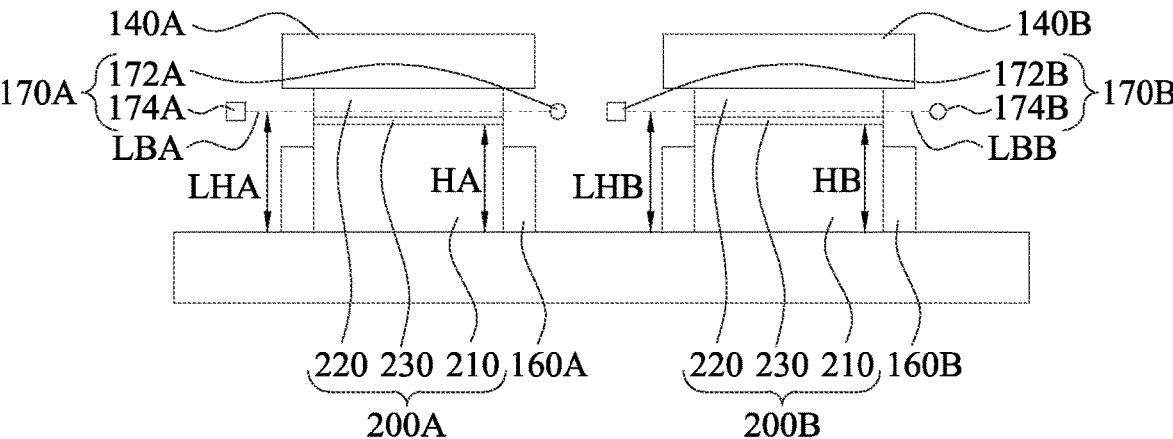
FIG. 9B is a simplified schematic front-side view of the apparatus of FIG. 9A.

Reference is made to both FIGS. 9A and 9B. FIG. 9B is a simplified schematic front-side view of the apparatus of FIG. 9A. In some embodiments, a first type of the wafer storage box 200 (indicated as wafer storage box 200A) may having different structures and/or materials than a second type of the wafer storage box 200 (indicated as wafer storage box 200B). For example, a joint between the case 210 and cover 220 of the wafer storage box 200A may be higher than a joint between the case 210 and cover 220 of the wafer storage box 200B, such that the sealing strip 230 of the wafer storage box 200A may be higher than the sealing strip 230 of the wafer storage box 200B. Stated differently, the sealing strips 230 of the wafer storage boxes 200A and 200B may be at different levels. For example, a height HA of the sealing strip 230 of the wafer storage boxes 200A measured from the platform 110 is greater than a height HB of the sealing strip 230 of the wafer storage boxes 200B measured from the platform 110. In some embodiments, the wafer storage boxes 200A and 200B have different heights. In some embodiments, the wafer storage box 200A is made of an opaque plastic material, such as polypropylene material. In some embodiments, the wafer storage box 200B is made of a transparent material or semi-transparent material that allows visual inspection without opening, such as polycarbonate material.

In some embodiments, for opening the wafer storage box 200, the apparatus 100 may include two rotary stages 120A and 120B over the working platform 110, two gripping mechanisms 140A and 140B respectively above the rotary stages 120A and 120B, two unlocking mechanisms 160A and 160B, and two light inspection devices 170A and 170B. Since the structural difference between the two types of the wafer storage boxes 200A and 200B, the gripping mechanisms 140A and 140B, the unlocking mechanisms 160A and 160B, and two light inspection devices 170A and 170B may have different configurations. In some examples, the light inspection devices 170A and 170B are at different levels. For example, a vertical distance LHA between the light inspection device 170A (or the light beam LBA emitted from the light emitter 172A and received by the light sensor 174A) and a top surface of the platform 110 is greater than a vertical distance LHB between the light inspection device 170B (or the light beam LBB emitted from the light emitter 172B and received by the light sensor 174B) and a top surface of the platform 110. In some examples, the gripping mechanisms 140A and 140B are at different levels. In some examples, the gripping mechanisms 140A and 140B may be at a same level. In some examples, a space between the unlocking mechanisms 160A is greater than or less than a space between the unlocking mechanisms 160B. In some examples, a space between the unlocking mechanisms 160A may be equal to a space between the unlocking mechanisms 160B.

In some embodiments, the apparatus 100 may further include a controller CR configured for receiving information from the light inspection devices 170A and 170B and for controlling operations of the rotary stages 120A and 120B, the gripping mechanisms 140A and 140B, the unlocking mechanisms 160A and 160B, and the light inspection devices 170A and 170B. The controller CR may be disposed in the cabinet below the working platform 110. The controller CR may include a computer-readable storage medium and a processor coupled to the computer-readable storage medium. The computer-readable storage medium stores program that controls various steps of the method M1'

(referring to FIG. 10) performed by the apparatus 100. The controller CR controls the operations of the apparatus 100 and robot arms RM1 by using the processor reading out and executing the program stored in the storage medium. The program may be one that has been stored in the computer-readable storage medium, or may be one that has been installed to the storage medium of the controller CR. For example, the processor can be a central processing unit (CPU), or a large scale integrated circuit, being an operating core and a control core. The apparatus 100 may further include wheels 104 and/or rails for convenience of movement. Other details of the components of the apparatus 100 (e.g., the rotary stages 120A and 120B, the gripping mechanisms 140A and 140B, the unlocking mechanisms 160A and 160B, and the light inspection devices 170A and 170B) are similar to the rotary stages 120, the gripping mechanisms 140, the unlocking mechanisms 160, and the light inspection devices 170 in FIGS. 2-8D, and thereto not repeated herein.

Figure 9C:
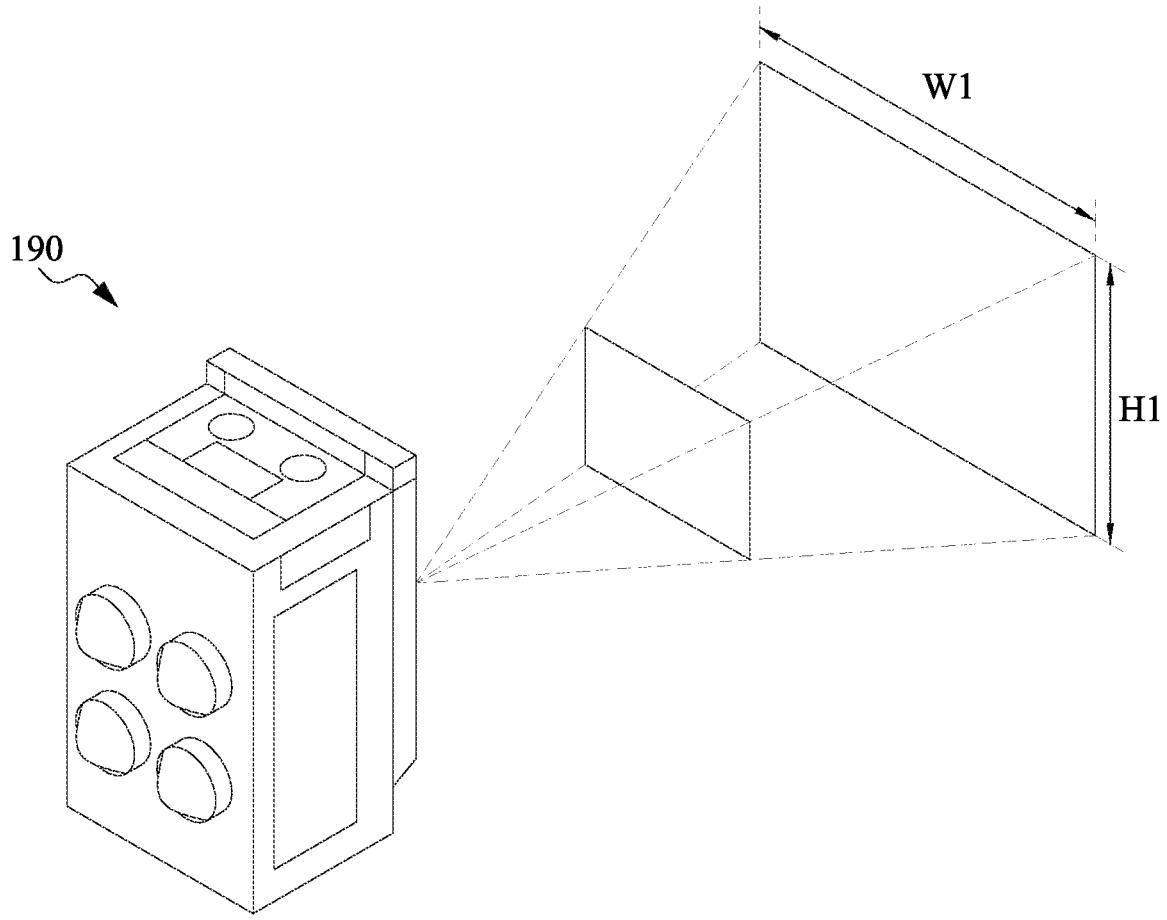
FIG. 9C is a schematic view of an image sensor of the apparatus in FIG. 9A.

FIG. 9C is a schematic view of an image sensor 400 of the apparatus in FIG. 9A. The image sensor 400 may be a camera with a suitable field of view (FOV), such that all features (including the identification code, tags, or other features) on a side of the wafer storage box 200 (referring to FIG. 9A) can be clearly detected with a suitable resolution by the image sensor 400. For example, the FOV height (also referred to as the vertical FOV) H1 of the image sensor 400 should be greater than a height of the wafer storage box 200 (referring to FIG. 9A), and a FOV width (also referred to as the horizontal FOV) W1 of the image sensor 400 should be greater than a width of the wafer storage box 200 (referring to FIG. 9A).

Figure 10:
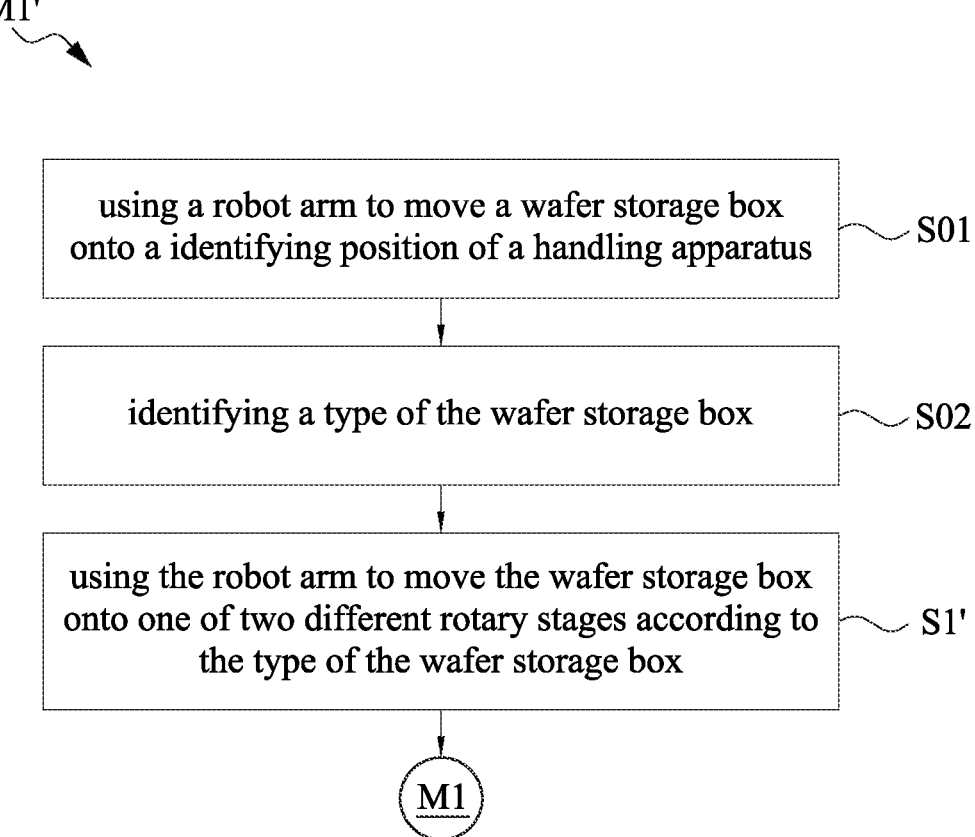
FIG. 10 is a flow chart of a method for handling a wafer storage box in accordance with some embodiments of the present disclosure.

FIG. 10 is a flow chart of a method M1' for handling a wafer storage box in accordance with some embodiments of the present disclosure. Reference is made to FIGS. 9A and 10. The method M1' may include steps S01, S02, S1' and the steps S2-S10 of the method M1 illustrated in FIG. 1. At step S01, the wafer storage box is moved onto an identifying position of a handling apparatus by using a robot arm. At step S02, a type of the wafer storage box is identified. At step S1', the wafer storage box is moved onto one of two different rotary stages according to the type of the wafer storage box by using a robot arm. It is understood that additional steps may be provided before, during, and after the steps S01-S1' shown in FIG. 10, and some of the steps S1-S10 described below can be replaced or eliminated for additional embodiments of the method. The order of the operations/processes may be interchangeable.

The method M1' begins at step S01, where the wafer storage box 200 is moved onto an identifying position of a handling apparatus 100 by using the robot arm RM. As aforementioned, the image sensors 400 may detect the information regarding the identification code, tags, or the features of the wafer storage box 200. For example, a top side and four lateral sides of the wafer storage box 200 are detected.

The method M1' proceeds to step S02, where a type of the wafer storage box 200 is identified. As aforementioned, the controller CR may receive the detected information from the image sensors 400 (e.g., images), and determine the types of the wafer storage box 200 based on the detected information. There may be two types of wafer storage box 200, such as aforementioned first-type wafer storage box 200A and second-type wafer storage box 200B.

The method M1' proceeds to step S1', where the wafer storage box 200 is moved onto one of two different rotary stages 120A and 120B according to the type of the wafer storage box 200 by using the robot arm RM. For example, if the wafer storage box 200 is determined to be the first-type wafer storage box 200A, the robot arm RM move it to the rotary stages 120A. On contrary, if the wafer storage box 200 is determined to be the second-type wafer storage box 200B, the robot arm RM move it to the rotary stages 120B. After moving the wafer storage box 200 onto said one of two different rotary stages 120A and 120B, the method M1' the proceeds to steps S2-S10 of the method M1 illustrated in FIG. 1. Other details of the present embodiments are similar to those illustrated above, and therefore not repeated herein.

Based on the above discussions, it can be seen that the present disclosure offers advantages. It is understood, however, that other embodiments may offer additional advantages, and not all advantages are necessarily disclosed herein, and that no particular advantage is required for all embodiments. One advantage is that the wafer storage box is open and closed by a box handling apparatus, such that the open/close speed of the wafer storage box can match the speed of the robot arm, thereby improving efficiency and reducing risks in interactions between humans and robots. Another advantage is that the box handling apparatus is equipped with a light inspection device for inspecting integrity of attachment between the sealing strip and the box, and an alarm event occurs when the inspection result indicates that the integrity of attachment is unacceptable. A maintenance process may be performed to recover the sealing strip back to its original position upon the alarm events occurs.

According to some embodiments of the present disclosure, a method includes placing a wafer storage box onto a stage; opening the wafer storage box, such that a sealing strip of the wafer storage box is exposed; directing a light beam over the sealing strip; determining whether the light beam is blocked by the sealing strip; and in response the determination determines that the light beam is blocked by the sealing strip, performing a maintenance process on the sealing strip.

According to some embodiments of the present disclosure, a method includes opening the wafer storage box by using a gripping mechanism; determining whether the sealing strip is detached from a ledge of a first side of the wafer storage box; and in response the determination determines that the sealing strip is detached from the ledge of the first side of the wafer storage box, performing a first maintenance process on the sealing strip.

According to some embodiments of the present disclosure, an apparatus includes a first stage, a first gripping mechanism, and a first light inspection device. The first stage is configured to support a wafer storage box. The first gripping mechanism is over the first stage, configured to grip and move a cover of the wafer storage box. The first light inspection device is over the first stage, wherein the first light inspection device comprises a light emitter configured to generate a light beam and a light sensor configured to receive the light beam, wherein a path of the light beam overlaps the first stage when viewed from top.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

placing a wafer storage box onto a stage;

opening the wafer storage box, such that a sealing strip of the wafer storage box is exposed;

directing a light beam over the sealing strip;

determining whether the light beam is blocked by the sealing strip; and in response the determination determines that the light beam is blocked by the sealing strip, performing a maintenance process on the sealing strip.

2. The method of claim 1, wherein the light beam over the sealing strip propagates along a horizontal path higher than at least a portion of a top surface of the sealing strip.

3. The method of claim 1, wherein the light beam over the sealing strip propagates along a horizontal path that is substantially parallel with a top surface of the stage.

4. The method of claim 1, wherein the wafer storage box has a first side directly below the light beam, and a path of the light beam over the sealing strip is substantially parallel with the first side of the wafer storage box when viewed from top.

5. The method of claim 4, further comprising:

rotating the wafer storage box, such that a second side of the wafer storage box is turned to a position directly below the light beam.

6. The method of claim 5, wherein after rotating the wafer storage box, the path of the light beam is substantially parallel with the second side of the wafer storage box when viewed from top.

7. The method of claim 1, wherein the maintenance process comprises:

adjusting a position of the sealing strip such that the light beam is not blocked by the sealing strip.

8. The method of claim 1, wherein opening the wafer storage box comprises:

disengaging a cover of the wafer storage box from a case of the wafer storage box, wherein the sealing strip is over the case of the wafer storage box.

9. The method of claim 1, further comprising:

in response the determination determines that the light beam is not blocked by the sealing strip, closing the wafer storage box.

10. A method, comprising:

positioning a wafer storage box on a stage;

opening the wafer storage box, such that a sealing strip of the wafer storage box is exposed;

directing a light beam to propagate along a horizontal path above the sealing strip;

detecting whether the light beam is blocked by the sealing strip at a first side of the wafer storage box;

in response to determining that the light beam is blocked by the sealing strip at the first side, performing a maintenance process on the sealing strip;

rotating the wafer storage box relative to the light beam; and detecting whether the light beam is blocked by the sealing strip at a second side of the wafer storage box after rotation.

11. The method of claim 10, wherein the horizontal path of the light beam is positioned higher than a top surface of the sealing strip.

12. The method of claim 10, wherein the horizontal path of the light beam is substantially parallel to a top surface of the stage.

13. The method of claim 10, wherein, when viewed from top, the horizontal path of the light beam is substantially parallel with the first side of the wafer storage box before the rotating step.

14. The method of claim 10, wherein rotating the wafer storage box comprises rotating the wafer storage box about a central axis by approximately 90 degrees.

15. The method of claim 10, wherein detecting whether the light beam is blocked comprises comparing a light intensity received by a light sensor with a predetermined threshold.

16. A method, comprising:

positioning a wafer storage box relative to a light inspection path;

opening the wafer storage box, such that a sealing strip of the wafer storage box is exposed;

directing a light beam to propagate along the light inspection path above the sealing strip;

measuring an intensity of the light beam received by a light sensor;

determining whether the sealing strip is detached from a ledge of the wafer storage box by comparing the measured intensity with a predetermined threshold; and in response to determining that the measured intensity is less than the predetermined threshold, performing a maintenance process on the sealing strip.

17. The method of claim 16, wherein the light inspection path is positioned higher than a top surface of the sealing strip.

18. The method of claim 16, wherein the light inspection path is substantially parallel to a top surface of the ledge of the wafer storage box.

19. The method of claim 16, wherein the predetermined threshold corresponds to a predetermined ratio of an intensity of the light beam emitted from a light emitter.

20. The method of claim 16, wherein the maintenance process comprises adjusting a position of the sealing strip to reduce a gap between the sealing strip and the ledge.

* * * * *